US007603321B2

(12) United States Patent
Gurvey

(10) Patent No.: US 7,603,321 B2
(45) Date of Patent: Oct. 13, 2009

(54) ELECTRONIC SYSTEM AND METHOD COUPLING LIVE EVENT TICKETING AND INTERACTIVE ENTRIES WITH THE SALE, DISTRIBUTION AND TRANSMISSION OF EVENT RECORDINGS, MASTERING SYSTEM AND INTELLIGENT TERMINAL DESIGNS

(76) Inventor: Amy R. Gurvey, 315 Highland Ave., Upper Montclair, NJ (US) 07043

( * ) Notice: Subject to any disclaimer, the term of this patent is extended or adjusted under 35 U.S.C. 154(b) by 0 days.

(21) Appl. No.: 11/253,912

(22) Filed: Oct. 18, 2005

(65) Prior Publication Data
US 2006/0173701 A1    Aug. 3, 2006

Related U.S. Application Data

(63) Continuation-in-part of application No. 10/442,468, filed on May 20, 2003.

(60) Provisional application No. 60/382,710, filed on May 22, 2002, provisional application No. 60/382,949, filed on May 24, 2002, provisional application No. 60/619,754, filed on Oct. 18, 2004.

(51) Int. Cl.
*G06Q 99/00* (2006.01)

(52) U.S. Cl. .................. 705/65; 705/50; 705/64; 705/52; 726/26

(58) Field of Classification Search ............. 705/50–59; 369/1; 726/26
See application file for complete search history.

(56) References Cited

U.S. PATENT DOCUMENTS 5,825,876 A * 10/1998 Peterson, Jr. ............ 705/52

| | | | |
|---|---|---|---|
| 6,614,729 B2 * | 9/2003 | Griner et al. | 369/1 |
| 2001/0018660 A1 * | 8/2001 | Sehr | 705/5 |
| 2002/0199198 A1 * | 12/2002 | Stonedahl | 725/86 |
| 2003/0023564 A1 * | 1/2003 | Padhye et al. | 705/54 |
| 2003/0097307 A1 * | 5/2003 | Greene | 705/26 |
| 2004/0137929 A1 * | 7/2004 | Jones et al. | 455/517 |
| 2008/0133416 A1 * | 6/2008 | Rhoads | 705/51 |

OTHER PUBLICATIONS

"Broadway Television Network Selects On.2.com to Poer Video-On-Demand Webcasts of Broadway Shows", Jun. 15, 2000.*

* cited by examiner

*Primary Examiner*—Jalatee Worjloh
(74) *Attorney, Agent, or Firm*—Allan Chan; Allan Chan & Assoc

(57) ABSTRACT

The present disclosure provides a method and system of electronically associating one or any combination of the production, balancing, editing, transmission, distribution and sale of live event "Recordings" with the sale of a "ticket" [defined to include any entrance payment/receipt, (tournament) entrance fee or logged placed bet] to or during the event, such that both or either of a ticket purchaser and/or non-ticket purchaser are able to automatically acquire a Recording or participate in interactive offerings related to the event by means of [optional] authenticated retrieval systems at a terminal device when connected to the Internet or wireless network. A method for electronically converting a balanced audience feed to the value for optimal Recording balance is also disclosed for optional integration. Distribution and/or retrieval of a Recording by patrons, non-attendee purchasers and/or licensees may occur when the Recording is embodied in a fixed medium of expression and/or when the Recording is in digital or other encoded format.

10 Claims, 9 Drawing Sheets

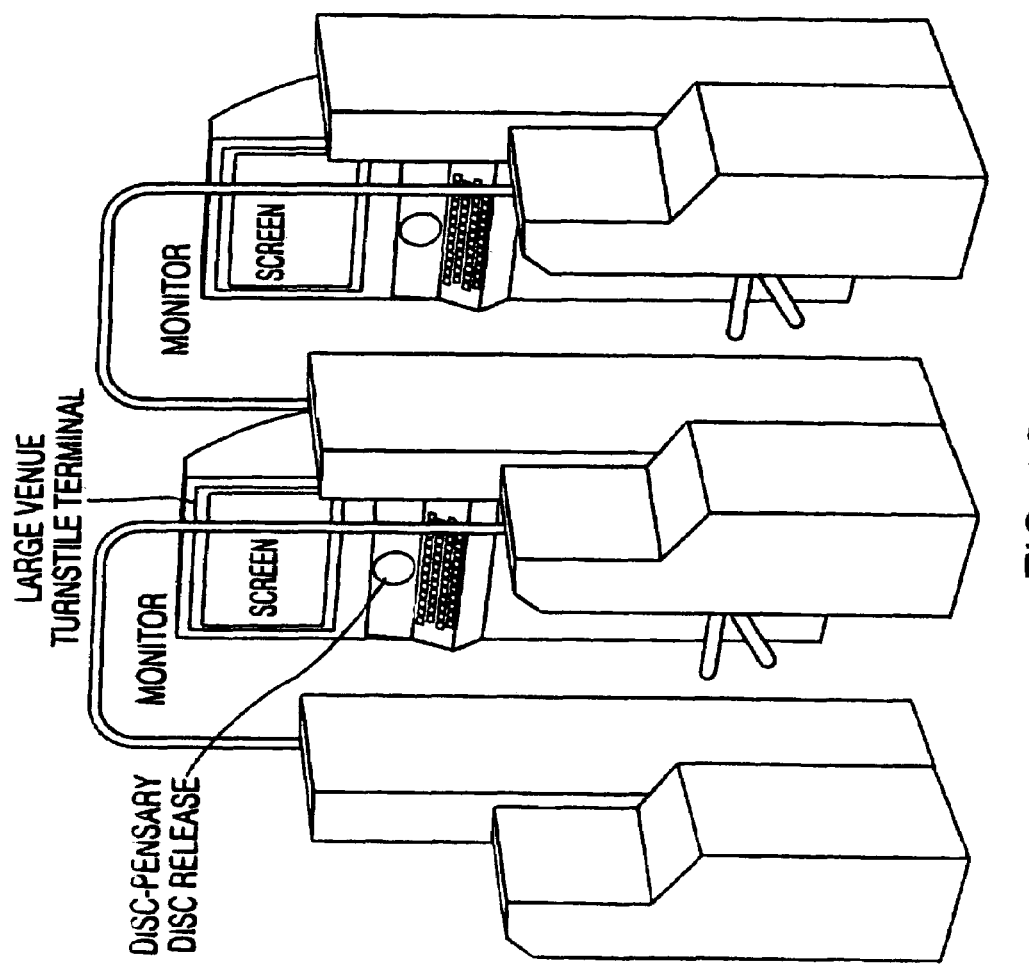

ELECTRONIC SYSTEM AND METHOD COUPLING LIVE EVENT TICKETING AND INTERACTIVE ENTRIES WITH THE SALE, DISTRIBUTION AND TRANSMISSION OF EVENT RECORDINGS, MASTERING SYSTEM AND INTELLIGENT TERMINAL DESIGNS

RELATED APPLICATIONS

This application is a continuation-in-part of application Ser. No. 10/442,468 filed May 20, 2003 which claims the benefit of U.S. Provisional Application No. 60/382,710 filed May 22, 2002 and U.S. Provisional Application No. 60/382,949 filed May 24, 2002, all incorporated herein by reference. This application also claims priority to provisional application Ser. No. 60/619,754 filed Oct. 18, 2004.

FIELD OF INVENTION

This invention pertains to a system and method of producing and distributing recordings of live performances.

BACKGROUND OF THE INVENTION

The advent of the digital age has demonstrated that any content or event (including live as performed content) that can be recorded and transformed into "bits" is a valuable, marketable commodity. In the past, major studios, record labels and production companies controlled what live content would be produced for distribution to the public. Except for live or tape-delayed grandiose television/cable productions, certain news coverage and special radio broadcasts, the live experience was limited to ticket holders/audience members.

Now, however, live content is inexpensive to digitally record. Virtually any lay personal can create a quality digital live recording of any event of public or private interest on simple equipment and then upload the recording over a telecommunications network. Such upload will result in free content ownership not only for the recorder, but also for any other interested user. Telecom-connected third parties can then, for example, burn their own CD's on home components or store the content onto a hand held music player. Once the recording is uploaded, then, it is game for others to copy and own it without payment.

The unauthorized digital transmission and retransmission Peer to Peer ("PtoP") or Business to Business ("BtoB") of pre-recorded studio titles, albums, and other derivative tie-in merchandise over the Internet since 1998 has virtually crippled the music industry. "Wi-Fi" now enables hook up to the Internet without a wire. Podcasts carried through Wi-Fi or satellite radio may not be far off. Clipcasts (transmissions of content to mobile phones) will shortly follow.

In spite of the spiraling decline in retail CD sales since 1998, the live concert market is surging. Concert ticket prices have skyrocketed. Coincident market penetration of handheld music players has necessitated a change within the music industry from an album to a singles oriented business model and the proliferation of on-line subscription services. With use of the instant disclosure, it is anticipated that concerts and recording from live events as well as interactive tournaments will be coveted by consumers and subscription services that reach the global audience.

In spite of this, to date, the full recording impulse buying potential of the live concert audience remains untapped. Concert hall shops still only offer an artist's pre-released studio product usually only in CD disc form and not the performance just attended. At the core are the continuing limitations on technology, the huge cost of recording and packaging productions for immediate on site and multi-media delivery, and the monetary and time constraints including for onsite personnel and staff needed for quality mastering and editing. In addition, for more grandiose live productions that feature multiple performers and whole orchestras, there is an impasse among the creative factions as to the proper royalties payable upon release. Musicians' unions and performing rights societies that collect royalties on behalf of composers and publishers contend that a digital encoded recording transmission over any telecommunications network is a separate "performance" triggering additional payments.

For these reasons, a necessary premise of the instant disclosure is that any viable market solution for live recording release must be inextricably associated with full royalty accounting, rights clearance and the equitable allocation of recording revenues among all those involved in production of the live event. The royalty accounting systems revealed in this disclosure do just this and will be independently licensed by the inventor for the management and administration of concert venues around the world.

At the same time, the present invention foresees that heightening anti-terrorism security systems are shortly to be installed by law or electively in public venues—newly constructed and existing—including Olympic sports arenas, international concert halls and airports. DNA fingerprint systems will be enabled to read the iris of an entrant's eye thumb print, etc., upon ingress or egress from and through the instant disclosure, can be simultaneously used at a venue to process audience recording orders separate from ticketing information.

The present invention further anticipates that with the advent of increasing bandwidth, live events, tournaments and performances as they are recorded and packaged will be electronically transmitted to businesses and computer users with increasing speed. This will help raise the market value of the live recording that is expected to surge immediately after the event ends particularly if it is publicized with pre-event ads issued, ordered and placed by the producers.

The instant disclosure is also premised on the fact that ticket holders will demonstrate a high proclivity for impulse buys if recordings are offered for sale immediately after final curtain at the hosting venue itself. In addition, it is anticipated that even greater sales will result if audience members and global non-audience fans can select their respective preferred means of retrieval. The instant disclosure predicts that adoring fans—regardless of geographic location—will always covet a complete repertoire particularly of a unique or special event. And while the CD is on its way out, for established patrons of the classical arts, it is still very much the preferred recording format.

The current trend in the music and entertainment industries is toward online subscription services. Web sites like iTunes, MSN, CNN, Yahoo, Amazon, AOL and Napster now offer content of all kinds—music, films, TV shows, sports replays, news clips and stock quotes for a fixed fee per month. Some of these sites are contracting with telecom companies to effect content delivery to cell phones. The recent institution of podcasts demonstrates that these sites will also offer live events, single titles and other tie-in merchandise like posters, T-shirts and pin-ups if packaging can be expedited and delivery effected BtoB or PtoP. They will also offer interactive gaming, response options and tournaments that are related to a live event.

Just by way of example—what if the global advertising campaign for release of a new "Harry Potter" book or movie was associated with an online tournament or offer? What if the coveted prize was an authenticated J. K. Rowling autographed poster? Further, what if the Indianapolis 500 could be instantaneously virtualized such that both audience members and interested fans from around the globe could steer their own cars along with the pack? In each instance, the global response would be huge. Fans would flock to any one or combination of location-based enabled intelligent terminals or enter from hand-held devices, home computers land and mobile phones thereby maximizing the geographic influence and market power of even a local event.

BRIEF DESCRIPTION AND SUMMARY OF THE INVENTION

Methods, systems and intelligent apparatuses[1] are disclosed for the immediate multimedia and electronic global ordering, sale, management, and authenticated distribution of live event content recordings by all means of delivery, transmission and retrieval now known or hereafter devised both on and off site from where the live event takes place. Methods and systems are also disclosed for the global solicitation and processing of authenticated electronic responses at live talent competitions, sporting events, and interactive games including from worldwide non-audience participants through enabled devices.

[1](individually claimed but enabled to be integrated)

With respect to distribution of live music, entertainment and event "Recordings" (as herein defined), the methods and systems disclosed reveal means that expedite and associate necessary and value added steps in the production, packaging, broadcasting and administration process. These include: (i) association of recording orders to ticket sales, subscriptions and/or uniquely identifying information of the holder including credit card number, phone/mobile phone number, subscription or podcast address, for example; (ii) methods for content mastering, balancing and editing; (iii) methods for splicing and packaging single titles, action stills and other unique derivative works; (iv) methods for creating director's cuts, "best of" versions and other derivative works; (v) methods for automated copyright accounting including calculation of statutory and contractual royalties from the point of every sale; (vi) integration of standard content security systems [e.g., encryption, watermarking and digital rights management ("DRM")]; (vii) integration of new venue anti-terrorism security systems; and (viii) solicitation and processing of recording orders from non-audience purchasers using any uniquely identifying information that helps directs transmission of content including, without limitation, home or mobile phone number, URL, e-mail or street address, credit card or banking number, personal account, podcast or satellite radio account, Blackberry or text messaging account, Social Security Number, date of birth, mother's maiden name, and most significantly, a DNA fingerprint.

In the sports and gaming field, entrant's fees and bets placed are to be used in this disclosure in lieu of or in addition to "tickets".

The disclosed systems and methods are optimally and immediately designed for use by classical artists, unsigned talent, "E-label" bands, their producers and arts institutions that are permitted to release live recordings without additional clearances. These groups need strong promotional tools and established distribution channels to test the market for new titles and contemporary works.

The instant invention will allow for the economical production, packaging and multi-media distribution of any live event recording no matter how small (recitals, benefits and special performances, for example) that with the previous art were not made available for release because it was not cost effective to do so at low sales volumes. This content was therefore previously "lost" after performance and could not be re-enjoyed by members of the public at large.

The systems disclosed are also designed for use by interactive game, sports television, film and convergence producers to assist with the solicitation and tabulation of audience and non-audience responses. Such responses serve to expand the types of entertainment experiences offered to the public and geographic influence and promotional value of a particular competition or event.

In addition, the systems are designed for podcast and satellite radio producers, suppliers and consumers who offer and covet audio programming for downloading onto computers or portable music players.

By the means herein described secured and authenticated ordering, packaging, delivery and retrieval of any live performance or event can be effected anywhere in the world at cost low enough to make it economically feasible even at low volumes. This includes release of a recording immediately at the hosting venue as soon as the event ends.

With the instant disclosure, packaging will be in either fixed or encoded format with delivery over any available telecommunications network, by hand or regular mail. By such means, audience members can order recordings either pre-concert with their tickets or after in any desired format including standard CD format by onsite handout or mail or by using a venue-based intelligent terminal, a portable hand-held music, media player, Blackberry or other test messaging device, a land line, mobile phone, other wireless device, or a home computer. With the instant disclosure, non-audience members can independently order the performance or a derivative recording and their orders will be integrated with those from ticket holders.

The present disclosure further describes independent methods that immediately account for and calculate all statutory and contractual royalties due upon release from each point of sale such that the job and expense of payment administration is removed form those individuals and entities authorized to release recordings. For ticket holders, concert venues and arts institutions, this would also include calculation of bonus or promotional discounts if recordings are purchased in advance with tickets or subscriptions. More importantly, the disclosed accounting methods are independent and provide a quick, easy and foolproof method for ensuring proper rights clearances and the equitable allocation of recording revenues among all associated with the live event. These systems will be independently licensed to concert and sports venues around the world.

The instant disclosure further provides wholly independent but integrated means for digitally mastering and balancing live recordings via storage of a plurality of content analysis algorithms that analyze and manipulate audio information with our without video in a database and/or on a "live" basis as additional information is received.

By the means disclosed, a flexible multimedia information analysis apparatus stores a database that includes both audio and video information. At the same time, also stored are a plurality of content analysis algorithms for analyzing the digital information, which can be manipulated by a mouse. A selected algorithm can then be used to analyze and edit the audio, video or audiovideo data including on a "live" basis as additional information is received. Further content analysis algorithms can be applied in tandem to manipulate the information including splicing out singles titles from a whole concert, for example. By such means, digitized readings that are optimal for audience listening and enjoyment can be automatically converted to optimal readings for a selected recording format. In addition, the disclosed methods will assist in the incorporation of additional content (narration tracks, for example), to produce further purchase options for the consumer including derivative works, "best of", director's cut versions and event-related stills, posters, pin-ups, artist bios, karaoke insertions and playbills. These systems are optionally enabled to be associated with ticketing and independently with non-audience orders. They can also process single title and derivate "best of" and director's cuts orders that incorporate supplementary material, including narration tracks, for example, in addition to whole concerts as performed, from any purchaser.

The present disclosure provides additional means for integrating anti-terrorism security systems anticipated to be installed at large sports/Olympic arenas, concert halls, auditoriums and public venues, e.g., airports and shopping malls and to take positive supplementary advantage of these systems by using them to order recordings.

It provides supplemental means for integrating standard content security methods including encryption, watermarking and DRM that track a recording as it is transmitted to an end user PtoP or BtoB. It further describes integrated systems for soliciting and processing audience and non-audience response information (also optionally associated with ticketing, subscriptions and podcast information) to allow for new forms of live interactive entertainment at a particular venue. The responses tabulated by the present invention will include ratings of live competitions without the need for open telephone land lines and will allow for the staging of both real and virtual competitions.

If betting is to be permitted, the systems further describe means of blocking responses from territories where gaming for profit is not permitted by law.

Finally the instant disclosure reveals the inventor's creative designs for venue and public space intelligent terminals that include without limitation, enabled audience seats/chairs, enabled security turnstiles, recording ordering kiosks targeted for arts institutions (lobbies and promenades), and enabled computerized tables that are to be installed at showcase cafes, clubs and gaming bistros. All terminals permit hook up of hand-held music players to USB or equivalent portals, USB keys, etc., take food and beverage orders, and pay checks and parking fees electronically. They also allow the purchaser to order and buy a recording in any desired format with a designated means of retrieval.

For example, a purchaser-ticket holder can insert the unused portion of the audience ticket or swipe a credit card to order a recording for home mail or computer delivery, to start an onsite disc engraving, release an already engraved disc from a machine, or enable immediately hook up of a hand-held music player. In addition, the terminals authorize transmission of follow-up and demographic information back to the recording purchaser, tournament/competition participant, or other individual/entity authorized to receive the information collected at the time of ticket issuance or recording sale.

The present invention discloses methods, systems and apparatuses that electronically associate any one or combination of the global ordering, authentication, sale, recording, production, mastering/balancing/editing, single title splicing, packaging, transmission, distribution, engraving, optional tracking, protection, and retrieval of "live event 'Recordings'" (as herein defined) with the sale of an event ticket, subscription order and/or other uniquely identifying information of a recording purchaser such as credit card number, phone/mobile phone number or Internet subscription account. In the case of live sports competitions and tournaments when gambling is or may be permitted, the present invention alternatively associates live event recordings with entrance fees and/or placed bets in lieu of or in addition to "tickets" and describes integrated methods that block out responses from territories were gaming for profit is not permitted by law.

The present disclosure reveals wholly separate but optionally integrated methods for processing worldwide live Recording orders that are independent of ticketing.

It further reveals integrated systems for ordering and/or delivering the live Recordings in any format including, by way of example, by hard mail, e-mail, over the Internet, to home and portable computers, hand-held music/media players, cellular phones, text messaging devices, podcast addresses and new Wi-Fi devices.

In addition, the instant disclosure reveals independent mastering, balancing, editing and splicing methods that assign numerical values to console and instrument feeds. As herein disclosed, a flexible multimedia information analysis apparatus stores a database that includes both audio and video information including the transposed console and instrument readings. At the same time, also stored are a plurality of content analysis algorithms for analyzing the digital information, which can be manipulated by a mouse. A selected algorithm can then be used to analyze and edit the audio, video or audiovideo data including on a "live" basis as additional information is received. Further content analysis algorithms can be applied in tandem to manipulate the information including splicing out singles titles from a whole concert, and packaging additional derivative tie-in merchandise.

Further, the instant disclosures describes systems and methods that allow both ticket holders and non-audience members to electronically rate and/or participate in a live staged event over any telecommunications network. The disclosed systems optionally authenticate entries and responses with ticketing or other uniquely identifying information that assists with directing transmission of the content.

Finally, the instant disclosure reveals the inventor's patented designs for intelligent terminals that take recording orders, are enabled to release recordings in fixed and unfixed formats and reroute authorized information back to the purchaser. These are targeted for arts institutions, hosting venues and public and private spaces including airports, banks and shopping malls.

Definitions

"Recording" or "Live Recording" as used in the present disclosure is defined to mean any audio, video, or audiovisual material or data based on signals or content emanating, derived from or representative of the live event or any part thereof, or an occurrence pre or post event that is related to it including, without limitation, as it is packaged for sale and distribution in any medium.

Without limitation, Recordings may contain/include as examples: audio, music, video, audiovideo, concert feed, recital, sports competition (baseball game, soccer tournament, etc.), stageplay or showcase presentation, press interview, mime production, literary work, theme park amusement, arcade tournament, game, videogame, display, art exhibition, artwork, autograph, photograph, clip, still, spoken dialogue, soliloquy, reading, lectures, speeches, seminars, classes and sermons, etc.

Typically, a "Recording" is stored, thereafter balanced, edited or otherwise revised in digital, analog or other format, and transmitted by a means of distribution e.g., broadcast signal, radio, over-the-air television, scrambled signal, cable, Internet, text messager, podcast, satellite radio broadcast, clipcast, regular mail, hand delivery, wire, cellular/wireless (so-called "Wi-Fi"), or by any other means now known or to be hereafter devised.

At some time, a "Recording" may become embodied or stored on a fixed, tangible medium of expression such as film, VCR tape, optical disc (CD, DVD, dual disc, etc.), magnetic cassette, reel-to-reel, LP, local or remote hard drive, mobile music player, or other storage medium, etc., or alternatively may be received, displayed, stored and re-performed without physical embodiment. For purposes of this disclosure, Recordings will be receivable in either a fixed medium of expression or unfixed format by a third-party to include without limitation a consumer, purchaser, third-party seller or licensee in analog or digital format [digital data (if necessary). Notwithstanding the foregoing, nothing contained herein is meant to limit the scope of the inventor's claims should other recording formats be made available in the future.

Retrieval of a Recording in any format for purposes of this disclosure will occur on or off site from where the live event takes place including, without limitation, immediately after the event ends at enabled location-based intelligent terminals/kiosks, home terminals (a home PC, media player, Web TV, etc. ), portable personal devices (hand-held music/media players, Blackberry or other text messaging device, e.g.,), from a third-party distributor such as an online subscription service, producer or podcaster and on mobile phones. To the extent that order and/or retrieval of a Recording is to be over a telephone wire, cable or cellular telephone or any telecommunications network, the instant disclosure is deemed to work with or incorporate any phone number, address, or other uniquely identifying data including without limitation, a DNA fingerprint, URL, e-mail, podcast or satellite radio address, mobile phone or other account number that assists in directing transmission of the content.

Utility

The utility of the present disclosure is apparent. The systems, individually and collectively, are designed:

(i) For use by arts institutions, performing artists and their production teams, sports organizations, concert venues, and public and private spaces (airports, shopping malls, banks, etc.) to offer a one-stop shop for the worldwide ordering, packaging and/or release of live content recordings in all media;

(ii) To provide new forms of interactive live entertainment experiences in close proximity and time with a live event, regardless of the geographical location of the interested consumer;

(iii) For use by arts institutions, performing artists and producers to assist in the immediate on and off site release of live event recordings;

(iv) To associate recording orders with ticket sales thereby allowing authentication and authenticated retrieval of recordings transmitted and released on and off site;

(v) To allow recordings to be ordered from the time of first ticket issuance thereby offering promotional bonuses and discounts to venue subscribers and global fans;

(vi) To provide a true litmus and market indicator of new talent, a contemporary composer, composition, title or premiered work both from audience members and from the non-attending global market;

(vii) To afford artists and producers additional feedback on an event and optional demographic information on recording purchasers in all media and territories, if authorized;

(viii) To ensure rights clearance and the foolproof equitable allocation of recording revenues in all media;

(ix) To assist with all newly instituted means of audio, video and audiovideo content ordering and transmission methods (including podcasting, for example);

(x) To anticipate heightened anti-terrorism security measures incorporated within public and private venues and to take positive advantage of those systems by using them to assist with the ordering of recordings;

(xi) To record, capture and distribute otherwise lost live content including of smaller, local events that traditionally would not have been released to the mass media or the public at large and with the prior arts, were never capable of being enjoyed by those who were not in actual attendance (either locally or around the world).

Using the instant disclosure virtually all live content can be now be efficiently and effectively preserved, packaged, automatically accounted for and immediately offered for distribution to the adoring audience as well as to fans worldwide. Audience members can now fulfill their need for instant gratification and at cost low enough to make it economical even at low volumes. Ticket holders can either order recordings pre-concert or immediately after it ends at venue-based intelligent terminals, or in the alternative, retrieve and take home a recording in one of several formats right then and there. In addition, those who did attend the event as well as to those who did not, can now own copies virtually in minutes. Discounted recordings can be offered as added perks associated with subscriptions and early ticket purchasers. Those who pre-buy can also be offered the added benefit of the right to receive promo information on future events and releases. After the performance or event, Recordings can also be bought at any intelligent terminal installed at the venue or other public spaces that include airports, shopping malls, retail outlets and banks. In addition, any interested purchaser can order a recording from a home computer, land line, cellular telephone, Blackberry, text messager or other enabled hand-held device by using a credit card of other unique identifying information of the purchaser including an online subscription account number or mobile phone.

To benefit from the instant disclosure are all parties involved in production of both the Recording and the live event as well as adoring fans that always covets a complete repertoire and new entertainment options Aside from added revenues, the artists and copyright holders can now have access to what in hindsight proved to be a great or unique performance. And the public at large gets the option to expand its listening library of a favorite artist.

By the means herein described, for the first time, Recordings can be offered for sale by any known means from the time of first ticket issuance.

When physical discs are ordered at any location-based terminal, the systems are designed to work with the latest capacity standard CDR engraving technology (whether incremental or non-incremental) either to start the engraving of a disc or in the alternative, to release an already burned disc or the signaled information embodying same. If a particular venue elects to install a combination ordering and disc engraving intelligent terminal, with CDR technology now between 40× and 52×, this will allow for authenticated release of even disc formatted Recordings to authorized retrievers immediately at the venue after final curtain. Audience members who have CD players in their cars can then re-experience a concert on the way home.

Global orders from those who did not attend the event can likewise be independently and immediately fulfilled by integration of appropriate systems. This will serve to maximize the market potential and promotional value of the event regardless of the geographic location of the purchaser.

Artists and composers who premier new works at a recital in a smaller locale will realize the added benefit of having these works optimally and quickly marketed particularly if they were not selected for release by a recording label. New bands and other "start-up" talent are likewise afforded the means to get their material immediately out into the marketplace and receive rapid feedback on their original compositions in actual dollars.

With increasing advents in technology that continue to compress the time and physical space needed to record and transmit audience responses to a live event, it is anticipated that at some time in the future, the present disclosure will allow for tabulation of on and off site ratings and responses as well as the public's participation in staged tie-in tournaments including from hand-held devices and cellular telephones. As the interactive response time becomes smaller and smaller over time with increasing bandwidth, both audience spectators and non-attending fans should be able to participate in virtually automatic ratings both from their venues seats and from enabled home computers, hand-held devices and cellular telephones.

The current trend towards reality television demonstrates that interactive viewing is a coveted by the entertainment industry. Shows like Fox's "American Idol" have already proven that there is a premium on interactive response programming because it performs advance market research on new talent. Moreover, because the major TV program suppliers and producers are no longer willing to pay a sitcom star $1 million per episode, there is increasing demand for less expensive distributable content of any kind particularly that which can be distributed to wireless telephones. This trend will continue to grow as more interactive television, radio devices and offerings (now including podcasts and clipcasts) penetrate the marketplace and the viewing audience can more easily fast forward through a sponsor's commercials.

Submitted for separate patent protection is the inventor's original intelligent terminal designs including, without limitation, those in the form of an enabled venue audience seat, an enabled venue turnstile, an enabled eating or beverage table and chair, and an expanded ATM ordering kiosk targeted for public spaces, concert venues, airports, banks, malls and retail stores. The table terminals are seen for installation in the next wave of restaurants/media clubs/gaming cafes/coffeehouses, etc. They are designed to take food and beverage orders and pay checks and parking electronically without a human waiter or waitress in addition to fulfilling Recording orders. The turnstile version is expected to be a big seller as tightened security systems at Olympic stadiums, venues and airports are installed including those that read DNA fingerprints of audience entrants.

All terminals will incorporate credit card and smart card swipes, rating/interactive systems, disc dispensaries, USB and equivalent portals for hook up of music players and storage devices, all of which are electronically authenticated and linked to entrance tickets, seat assignments, food and beverage checks, a cellular phone number, URL, e-mail, podcast address, other account, or other identifying information of the purchaser.

The systems herein disclosed are further enabled to process special purchase orders. For example, individual titles (singles) from a live performance with or without accompanying video will be spliced out, specially formatted, accounted for at competitive pricing on the order of $1.00 per title and offered for sale over the Internet for storage on hand held music players. Live singles will also be offered for sale on Internet subscription services along with event-related interactive games and tournaments. Also to be made available are director's cuts, narrated tracks, "best of" selections from a particular artist's tour and personalized compilations inclusive of audience noise, monologues, artist soliloquies and narration tracks.

All Recordings especially the spliced singles tracks—expected to be a big Internet seller—can be optionally watermarked, encrypted and protected with available DRM systems by integrating standard methods. These new live sound recordings of even old titles are expected to compete with the pre-released digital studio recordings that are now being freely shared over the Internet and crippling the recording industry. The inventor believes release of live singles presents one means to reverse spiraling losses attributable to the unauthorized sharing of digital files over the Internet in that it will offer alternative and fresh versions of a favorite artist's titles. Integration of screened video feeds after digitization present an inexpensive means to produce music video downloads at much lower cost that can be transmitted to cellular phones.

The inventor's disclosed accounting systems are key to keeping administration costs low. They are enabled to automatically calculate the statutory and contractual royalties payable to all involved in production of the live event and its Recordings. Labels, managers and producers can select any accounting format compatible with their current systems. Each participant's confidential accounting statements will be available 24/7 by secured key over the Internet and will offer information from every point of sale. Singles delivered to a cellular telephone will be accounted for by these same systems.

B. History of the Field

Historically, live entertainment events when recorded for live or tape-delay distribution to the mass media were relatively expensive productions. They were designed with high quality processes and formatted to meet broadcast standards. Originally, live recordings were made on film and/or tape but are now recorded by digital technology, and often with modest equipment. Now, even with advents in technology, tie-in merchandise like T-shirts, autographed pin-ups and cups that are being offered for sale to the public in on-site venue stores and retail outlets are generic, i.e., they do not to relate to or symbolize the specific event attended.

In the traditional music industry business model, live performance revenues were reserved in standard label contracts by the artist for their own exploitation. This meant that venues, event producers and promoters made their revenues only from audience ticket sales, commissions from on-site concession and sales of tie-in merchandise as related to the artist's reserved rights, and the artist's label did not share in these sales.

Conversely, the decision as to whether to release an audio or audiovideo recording of the live performance remained in the exclusive control of the artist's record label. Because the costs associated with broadcast-quality productions were so high and there was an additional concern that new releases might interfere with stable revenue streams from previously released whole albums, very few live events were made available for home release including for those who did not attend the live performance. The on-site stores at the Continental Arena at the Meadowlands, Tanglewood or the Metropolitan Opera, for example, sell only the artists' pre-recorded studio albums, not the CD of the performance actually attended.

In a similar fashion, concerts in smaller municipalities or those given by new, unsigned bands just building a following, solo recitals of classical artists, local stage productions, sporting competitions like horse racing, NASCAR and major/minor league baseball, educational seminars, speeches, etc., have almost never been produced for the mass media or home distribution. The live experience has been limited to the actual audience and spectators, i.e., those lucky enough to get "tickets". One exception is OTB where the live event is televised in specific networked locations for the benefit of all who place bets.

Basic recordings were, however, made of most live performances and sporting events, using simple equipment of modest quality, for reference, study or promotional purposes. Additionally, the press would cover highlights of certain local events (college competitions, e.g.) and archive footage for future stories or ancillary licensing. In the sports field, this business model works because once a competition is over, most of the commercial value of the event is lost.

Such is not the same for the music industry, however. When a great performance or concert has taken place, in hindsight the entire world may relish the chance to see it and even own it.

But even in the music business, tie-in videogames never became a standard part of the business model because of the limitations on technology and the prohibitive costs of production. With the instant disclosure, however, this will change. Any concert can now be the focus of an interactive promotional campaign that is tied to ticket sales and subscriptions. Certainly this advertising strategy is a lot cheaper and will expand geographic interest in the event.

What does this mean in dollars? In a nutshell, it means that with the prior art, most live events—even unique and quality performances and competitions as they continued to be staged around the globe everyday—had the fate of becoming "lost content". Live events are still not being exploited to their maximum potential because the systems in place were designed only to generate revenue from ticket sales and keep venue revenue sources separate from those belonging to the record labels.

In the music field, starting March, 2003 ten months after the preliminary application for the instant disclosure was filed, a handful of disc burning concerns attempted non-automated, non-authenticated physical CD handouts at small performing venues by incrementally transferring single titles onto a master as they were tracked. These companies conceded that with this method they could not fulfill the Recording demand of a large concert audience or any immediate outside orders.

In addition, standard CDR burning technology is now available at 30x-52x (one CD in little over a minute) even for home components. With standard technology as it may be updated, the on-site methods and systems disclosed herein do not require incremental track transfer to cut disc compression and duplication time (for those that want discs) and thereby can satisfy any size audience as well as outside orders all at the same time.

With the increasing costs of TV programming and the trend towards reality TV, basic digital recordings are now recognized as valuable, marketable content. Now, depending on the particular event, even the most basic recording can increase in value over time. TV shows and theatrical films like "American Idol", "The Apprentice" and "The Truman Show" demonstrate just how valuable even raw content has become. The announcement heard at the beginning of virtually every live event that cameras and recording devices are strictly prohibited, is definitive proof of the value of live Recordings even if they are not optimum quality.

With fast-forwarding options becoming more prevalent on home media players that bypass commercial advertisements, networks are no longer willing to pay a sitcom star $1 million per episode as they did in the final seasons of "Friends". In January, 2004, Mezzo-soprano Marilyn Horne told a seminar class that she was only able to incorporate a particular song on her $70^{th}$ Birthday Album because it had been unlawfully recorded at a concert by an audience pirate. Norah Jones' early primitive recording sessions in solitude are now extremely valuable as background material not only for her own albums but also for the hot selling DVD releases of the Grammy Awards.

The analysis is no different for professional and amateur sports. Wouldn't at least some fans still want to watch Don Larsen's perfect game or receive a clip from a Yankee rally during the post-season superimposed on a T-shirt or autographed poster? If a fan didn't tape a game he attended, isn't it also likely that he may still want to buy a copy for reference or study?

In the music field, statistics show that many find live or "recorded as live" concerts far more satisfying than highly edited and planned "studio" recordings. The audience cheers, applause and artist monologues make the live recording far more exciting and have not been shown to cut into revenues generated by the original album.

Also, fans of an artist usually also covet a complete repertoire. In July, 2004, Business Week reported that 20-30% of an attending audience will order a CD of a concert attended on their way out the door. Whether that should be a physical engraved disc, a download direct to an iPOD or an order for home delivery is a decision this inventor will leave to the purchasers and venue owners to decide for themselves. Both are claimed in this disclosure.

Master classes, seminars and lectures by an adored artist also have inherent value.

And how many unsigned bands have downloaded their original material in hopes that get one of the "illegal" file sharing companies to pick it up even for listening by pirating teenagers? New acts will do almost anything to get free publicity. Now many avoid signing with a label because it has become increasingly clear that the labels are no longer in optimal control of the buying market.

It is not unusual that a great talent, artist, contemporary composer, or ensemble of great talents may appear or premiere works in a unique performance as in a benefit concert, gala, limited tour or opening and/or perform in a smaller market for a particular function or celebration. Many view the failure to offer these concerts as depriving the public of an artist's complete repertoire and/or interfering with a new artist's right to publicity. The May 15, 1999 Carnegie Hall recital of the "New Goldberg Variations" performed by cellist Yo-Yo Ma with a single piano accompanist is such an example. Royalties and guild residuals would have been minimal for release of this recital because a full orchestra was not involved. Yet it was never released by SONY Classical. Why not?

Renee Fleming and Ruth Ann Swenson, now probably the most marketed American sopranos in the world, formerly appeared on the 1998 program of the Marilyn Home "New Artist Series" at Carnegie Hall. International classical music fans as well as patrons and subscribers would love to own a copy of this event. Yet the union and creative factions there continue to wrangle over royalties, regardless of the value of the recording.

C. Utility/Marketability

That there is a clear positive market for live recordings, even if of less than optimal quality, therefore, is a given. The proof can be found in the "warning" message to the audience heard before virtually every live performance or professional sports competition informing patrons that recording is illegal and strictly forbidden. Only in the rarer instances when the artist, celebrity or producer has already licensed grander broadcast rights for live or tape delay production will the basic digital recording serve less than an absolute useful purpose, but as demonstrated above, a commercial purpose nonetheless even if only to fulfill tie-in merchandise orders.

Start-up bands are in desperate need of fast and efficient distribution channels for their original material in hopes of discovery. Now, even many veteran artists elect to negotiate with labels and concert venues so that they can offer their live performance recordings for sale in multiple formats.

Within the artistic community are certain rules and mores that using the prior art prevented capitalization of the live content market when the preliminary application for the instant disclosure was first filed in 2002. As aforementioned, the major labels and producers own the exclusive rights to the releases of their signed and featured artists including live performances. Moreover, the standard artist-label contract usually prohibits distribution of a recording without the artist's prior approval. Whether a label may have negotiated an "out clause" for live concert feeds must be analyzed on a case-by-case basis, another expensive administrative hassle for the label.

The only present exception is in the field of classical music because studio releases have never sold as well. Because of this, for the last few years, classical artists have been given "out clauses" to release their live recordings that were not given any artists five years ago. But even with these new contracts, the labels have remained reluctant to share of any part of live Recording sales with the hosting venues because they in turn do not participate in ticket and concession revenues. To help solve the impasse and the continuing decline of the recording industry, both parties along with musicians' unions, performing rights societies and digital rights management organizations may now have to negotiate if they want to keep consumers happy and keep pace with advents in technology.

While in the past the labels feared that new live releases would interfere with their long-standing relationships with retailers and in turn stable revenue streams from classic prerecorded albums, they affirmatively avoided placing competing releases including live sound recordings into the marketplace. Now, with disc retailers becoming less significant with the marked increase in free digital file sharing and paid downloads to hand-held music players, these prior concerns have no rational basis in dollars.

Royalties, however, remain especially high upon ancillary release of a concert when a full orchestra is involved particularly in a top union house. Royalty payments are a sticky negotiation point for every grandiose music special packaged for multi-media release. Union engineering contracts make live production costs even more prohibitive at certain major venues like Carnegie Hall. Now we have podcasts and clipcasts where audio programs classically carried only on radio are made available via special software for download to home computers and mobile phones.

Special live concerts broadcast from a Wi-Fi hotspot is almost certain to become the next genre of podcast series and quality systems of management and administration as presented in the instant disclosure will be sorely needed. Whether a digital transmission is a "performance" as defined in the US Copyright Act, will not ultimately prevent a buy-out price per event by each of creative factions. Even other administrative nightmares like paying mechanical royalties when a concert is to include material composed by an individual other than the featured artist or one signed to a different label, are managed by the instant invention.

In 2002, when the preliminary application for the instant disclosure was filed, the news from the Recording Industry was unanimous that labels and copyright holders were avidly searching for new ways to replenish recording revenues lost to Internet piracy and file sharing. Motion picture studios also reported becoming increasingly concerned about digital piracy of theatrical films. The answer, as proven by the subsequent exponential surge in ticket sales and new forms of interactive entertainment, may well be active pursuit of the live content market with implementation of the systems herein disclosed.

Statistics continue to confirm that a significant number of concert goers (20%-30% +) will buy a Recording of an attended event if delivery can be expedited. Further statistics show that there is a premium on being able to offer instant gratification to an audience on the way out of the venue. A higher percentage will purchase if a preferred method of retrieval can be designated. A cup or T-shirt is far less attractive than the performance itself. The instant disclosure provides the most comprehensive recording purchase options to the consumer. In addition, the venue selects whether the inventor's intelligent terminals installed onsite will offer authenticated recording ordering, encoded delivery to handheld devices and also actual CD burning and engraving.

In sports, the videogame industry is itself a multi-billion dollar business. Interactive game(s) are a natural supplement order for a sports entry ticket. If fans in the audience and elsewhere could all participate in a staged virtual tournaments related in time and space to the live competition, the promotional value could be huge. The end result would be broadened geographic interest even in a local event and a ring side seat on a cell phone.

A sport celebrity's and/or artist's pin-ups, posters and T-shirts sell extremely well and may even appreciate over time. Making a still or autographed photograph of a shortstop's great play immediately available would be a certain "hit" almost like catching a foul ball in the stands. All such orders are most efficiently fulfilled when linked to ticketing operations.

The present invention and disclosure conquers these and many other problems traditionally associated with the immediate marketing of live event Recordings. These include but are not limited to:

The technological and speed limitations on on-site live recording ordering, balancing/editing, fulfillment, physical disc engraving and authorized retrieval of the live content in fixed, analog, digital and/or other encoded format;

The cost of manually gathering the information associated with the sale(s);

The huge prototype costs including costs of on-site intelligent terminals;

The technological limitations on authentication;

The technological limitations on editing and balancing;

Integration of technology that ensures confidentiality to purchasers;

Integration of technology that ensures protection of the live content;

The lack of systems that associate mobile phone and other electronic live recording orders with ticketing and/or immediate and subsequent live sales around the world;

The lack of systems that integrate all recording orders pre and post event in all media;

The job of securing clearances of all parties necessary to effect live recording release The job of securing the artist's prior approval to the live release particularly if required by contract;

The cost of separately producing and advertising;

The cost of high engineering fees particularly in union houses;

The cost of the residuals and both statutory and contractual royalties owing to all performers, copyright holders and participants upon ancillary distribution;

The cost and clearances required for multimedia of recording delivery including Wi-Fi, satellite radio, podcasting and clip casting;

The overhead of music and live recording publishing administration;

The overhead of royalty accounting including calculation of participations, copyright royalties and payments to guilds and performing rights societies, and generation of statements as may be audited;

The cost of litigation and insuring against it particularly in the gray area of digital distribution;

The cost of updating to keep pace with advents in technology;

The costs of servicing all systems, terminals and equipment;

The loss of impulse business if the customer has to wait a long time to receive a Recording or tie-in merchandise from the event;

The technology and speed limitations of already attempted methods of onsite disc burning because the customer must wait for discs to be balanced, edited, burned and physically handed out, rendering the tried methods insufficient to accommodate a large concert or sports audience;

Potential losses from unauthorized uploads and digital piracy of the live content including from a previous performance during a particular tour;

The technology limitation on integration of all methods and systems needed for financial success; and The lack of systems that organize and process demographic information from purchasers so that future events and releases can be better marketed while still maintaining the confidentiality of those purchasers who so designate;

The cost of insurance to guard against infringement and misappropriation.

SUMMARY OF THE INVENTION

The instant disclosure presents novel, useful and unobvious systems, methods and intelligent apparatuses that efficiently, quickly and economically capture and exploit otherwise lost live content. Methods, systems and intelligent apparatuses are disclosed for the immediate multimedia and electronic global ordering, sale, management, and authenticated distribution of live event content recordings by all means of delivery, transmission and retrieval now known or hereafter devised both on and off site from where the live event takes place. Methods and systems are also disclosed for the global solicitation and processing of authenticated electronic responses at live talent competitions, sporting events, and interactive games including from worldwide non-audience participants through enabled devices.

With respect to distribution of live music, entertainment and event "Recordings" (as herein defined), the methods and systems disclosed reveal means that expedite and associate necessary and value added steps in the production, packaging, broadcasting and administration process. These include: (i) association of recording orders to ticket sales, subscriptions, podcast address and/or uniquely identifying information given by the holder at the time of issuance; (ii) methods for content mastering, balancing and editing; (iii) methods for splicing and packaging single titles, action stills and other unique derivative works; (iv) methods for creating director's cuts, "best of" versions and other derivative works; (v) methods for automated copyright accounting including calculation of statutory and contractual royalties from the point of every sale; (vi) integration of standard content security systems [e.g., encryption, watermarking and digital rights management ("DRM")]; (vii) integration of new venue anti-terrorism security systems; and (viii) solicitation and processing of recording orders from non-audience purchasers using any uniquely identifying information that helps directs transmission of content including, without limitation, home or mobile phone number, URL, e-mail or street address, credit card or banking number, personal account, podcast or satellite radio account, Social Security Number, date of birth, mother's maiden name, and most significantly, a DNA fingerprint.

In the sports and gaming field, entrant's fees and bets placed are to be used in this disclosure in lieu of or in addition to "tickets".

The systems disclosed include but are not limited to coupling "ticket" sales with orders for event content Recordings that also specify the preferred method and/or location of retrieval and can be optionally authenticated and/or protected by the integrated methods herein described. They describe wholly new ticketing/ordering operating systems that can be integrated including without limitation an interface to work with existing ticketing software (even when orders are placed over a phone) which converts the ticketing data into a readable language, XML for example, thereby creating an overlay and allowing for the authentication of information already input. Such coordinate systems equally apply to data input for tournament entrance fees or placed bets as well as or in lieu of "tickets". They further apply to methods authenticating orders to delivery codes including assigned land lines, cellular telephone numbers, URL's, e-mail, text messaging, subscription, podcast and clipcast accounts, DNA fingerprints or any other uniquely identifying information that directs transmission of the content. The term "Tickets" and as used in the instant disclosure, therefore, relates not only to the entrance receipt resulting from the ticket sale transaction but also to tournament entrance fees, bets placed or other information of the ordering or receiving terminal including as example a land or cellular phone number which can be authenticated and/or receipted to uniquely identify the buyer/placer by any electronic or other means now known or hereafter devised.

The present invention incorporates systems and methods of assigning numerical values to live audience feeds and then converting the digital reading(s) balanced for an audience to those for a CD track mix.

The present invention incorporates methods for placing special orders for audio-balanced, spliced, edited and other derivative event Recordings including without limitation single music tracks with our without accompanying video including without limitation from installed video screens at the event, those with and without audience noise and/or artist monologues, sports highlights, "best of" compilations, director's cuts, narration tracks, photographs, stills and tie in merchandise, posters, pin-ups, T-shirts, cups, celebrity endorsed games or videogames, etc.,—and associating these with the "ticketing" and other systems herein disclosed.

The present invention also incorporates systems wherein the purchaser is given the option to receive promotional material for other subsequent event announcements and merchandise.

With the systems herein disclosed, purchase and retrieval of Recordings embodied in a fixed tangible medium of expression (CD, DVD, VCR tape, etc.), or in non-fixed analog, digital or other signaled format may take place at the venue itself, at location based intelligent terminal kiosks including enabled tables at eateries, coffee houses and showcases and terminals at any other location including airports, malls, and retail stores, at an ATM machine, or at a home personal computer, cellular telephone or other apparatus.

Further disclosed are independent methods and systems for processing outside orders for the live events Recordings from those who did not attend the event and/or who have no access to on-site points of sale. These orders may be placed over the Internet, by regular land line or wireless phone number that pursuant to the instant disclosure may be linked herein to the ticketing operations.

The instant disclosure presents a technological solution to deter the unauthorized sale and/or upload of shared digital files by offering downloaders fresh content of featured artists to compete with their previous studio Recordings that are now being shared for free and crippling the Recording industry.

The present invention discloses integrated methods and systems for prompt, accurate and virtually automatic calculation and payment of statutory, guild and contractual royalties to copyright holders and participants alike by managing accounting from the point and moment of sales. This allows for the immediate equitable allocation of revenues and the tremendous lowering of the overall costs of production and distribution. Disclosed is a system for protected key access by all copyright holders to their royalty accounts and demographic information to the extent that purchasers authorized its disclosure.

The present invention is a complete system and method providing a legal, efficient way to maximize the revenue and the promotional value of the live event, track the content sales, gather the required information and transmit that information to all parties involved in the production, manufacture and fulfillment of sales as well as to those entitled to share in revenues and at cost low enough to make it practical even at low volumes.

Equally important, by returning control of content releases to the copyright holders (which in turn will allow for the offer of discount and promotional tie-in pricing concurrent with ticket sales), the present invention will serve to encourage new and established talent to remain within the structure of the existing system, thereby providing a win-win-solution to all—studios, labels, and participants alike.

Further, the present disclosure offers the public the opportunity for instant gratification and impulse buys at comparatively lower cost to the suppliers without the need for "hand out" sales or additional sales personnel.

The system incorporates rating and interactive systems to enhance the live experience and its geographic influence and also to allow for participation staged tournaments and contests by ticket holders and non-audience members alike.

Optionally, Recordings including single tracks may be separately encrypted, watermarked, formatted and/or rendered destructible by known industry means, integrated with other systems described and offered to consumers over the Internet for a download fee and transfer to hand held players.

Other special purchase orders including "best of" compilations, director's cuts and narration track versions are anticipated to be especially attractive when multiple performances of a live event take place at the same or different venues, as during a revival or artist's concert tour. To the extent that pre-event disc production may incorporate already approved performances of certain titles from a prior concert of a current tour, the systems integrate those balanced, edited and production systems as well.

Separate integrated methods and systems are disclosed for automated mastering and editing including digitizing console and instrument feeds through the use of algorithms. These systems and other editing and disc burning/engraving technology that may currently exist or hereafter be devised, are described as to be integrated with the ticketing and Recording ordering systems herein described and/or the system as a whole.

In total, these methods individually and collectively comprise the collection and input of purchaser information starting optimally at the time of first ticket sales, the optional integration and processing of mastering, editing and digitized balancing data, and secured transmittal of that information to all parties responsible for the fulfillment, manufacture and distribution of the Recordings, as well as to those entitled to payment by statute or contract.

In the instance where the Recordings are to be delivered by immediate and/or electronic transmission directly at the venue or devices including a land or cellular telephone or other enabled appliance, methods and systems of authentication of the ticket holder's or outside purchaser's information including his assigned phone/cellular numbers, e-mail address and/or bank account are incorporated and disclosed to ensure authenticated delivery to the proper party at the time and/or location of retrieval. Integration of standard secured credit card technologies will allow on and off site sales at any enabled terminal location including without limitation at a home computer or cellular telephone to all who did not pre-buy Recordings. All purchasers and can elect to receive promotional information for upcoming releases, games and other live events. In the systems disclosed, the buyer/orderer will maintain the right to have such information transmitted to the copyright owners as part of an overall demographic package or to keep such information confidential.

Optionally to be added to the system are integrated methods to handle the purchase and/or license of grander scale broadcast productions and home distribution versions. For those cases where the pre-approval of the artists is required prior to release of a Recording, integrated are disclosed systems to block sales until and only if such consent is secured.

Systems for audience participation and ratings, videogame or interactive tournament play or live content merchandise auctions or stock markets, can be optionally integrated into the systems disclosed to enhance the complete live experience and encourage participation by spectators and non-audience members alike.

BRIEF DESCRIPTION OF THE DRAWINGS

FIG. 6(a)-(d) depict the inventor's original intelligent terminal designs separately submitted for patent protection.

DETAILED DESCRIPTION OF THE PREFERRED EMBODIMENT

Figure 1:
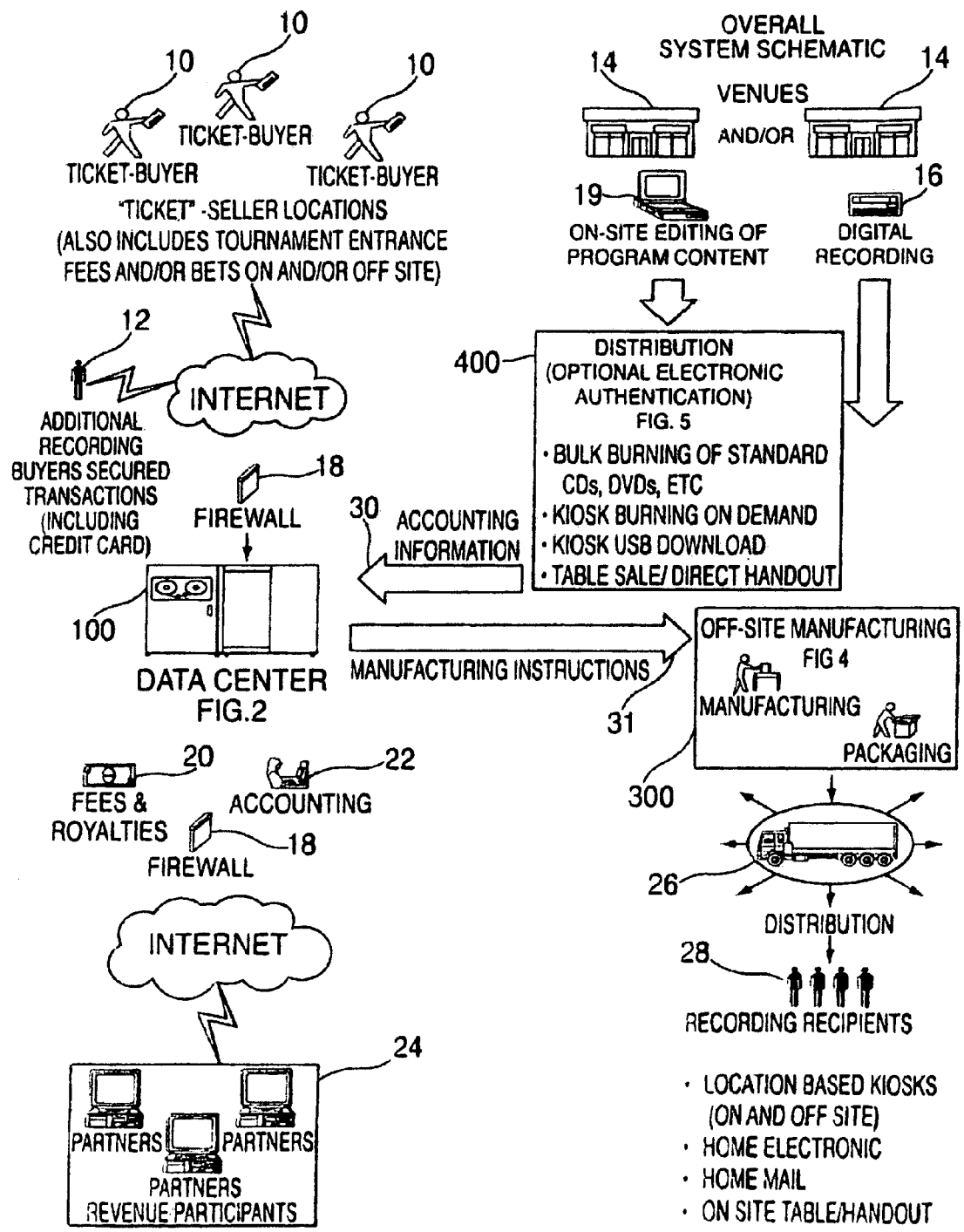
FIG. 1 depicts an overall schematic or block diagram of a system constructed in accordance with the present invention.

While the instant invention is susceptible of embodiment in many different forms, there is shown in the drawings and herein described in detail preferred embodiments of the invention with the understanding that the present disclosure is to be considered an exemplification of the principles of the invention and is not intended to limit the principles or scope of the invention to the embodiment.

As is now standard in the industry and in referring to FIG. 1, the system architecture of the preferred embodiment of the present invention is implemented using a Data Center, a plurality of venues using standard point of sale equipment and a plurality of terminals. The Data Center is in communication with each venue and each purchaser or licensee terminal through the Internet or any wireless application. The terminal can be any device through which a user can access a Website, e.g., a personal computer, a personal digital assistant, an Internet-through-television device, a cellular telephone, or any type of many available wireless devices available in the market, or any updates as may now or hereafter be devised.

Referring to FIG. 1, the Data Center (100) preferably comprises database servers (100A), Web servers (100B), a load balancing router (100C) and a firewall (18) connected to the Internet. The firewall (18) receives messages from the Internet (19) and forwards the messages to the load balancing router (100C) and likewise receives messages from the load balancing router (100C) and forwards them to the Internet (19) or other similar distributed computer network. The firewall (18) preferably performs a number of filtering functions and network address translations in order to safeguard the Data Center from unauthorized access. The firewall (18) also preferably encrypts and/or watermarks the message using known public key/private key encryption and standard methods and may also integrate Digital Rights Management ("DRM") tracking. The load balancing router (100C) forwards messages received from the firewall (18) to one of the plurality of Web servers (100B). The load balancing router (100C) also forwards messages received from the Web servers (100B) to the firewall (18) for transmission to other sites through the Internet (19). In this manner, the load balancing router (100C) distributes tasks to be performed to one of the plurality of Web servers (100B) in order to distribute processing demands. The Web servers (100B) access the database servers (100A) to retrieve and store information in response to received messages from the terminals (not shown). The database servers (100A) store data tables which contain information about various venues, events, accounting, royalties payable, fixed payment allocations, ticket resources, ticketing software, user rules, ticket status, ticket holders and tournament entrance fees and bets placed (if applicable).

An end user (10) can access the Data Center (100) by using a standard Web browser on a terminal (not shown). However, non-standard, custom software can also be implemented or Web browser software on the wireless device such as a personal digital assistant or cellular telephone. Terminals can log into the Data Center (100) to view events which will take place in the future, purchase tickets, allow patrons to access Recordings from the just-completed live event (212), interact to rate a new act or the event itself, and/or to buy interactive games to participate in the event itself or in staged tournaments with other users or spectators (10).

Moreover, other information including user roles, options for Recording retrieval including location, means of retrieval and incorporating burning, engraving, mastering balancing, editing technology as may now exist or hereafter be devised including through the use of algorithms as herein disclosed, may be implemented. Choices may include venue, management, artist, record label, team owner, event management, ticket buyer/ancillary purchaser, retrieval immediately at venue by CD or DVD, or for delivery by digital transmission/USB port at a location based kiosk, at home by mail of by home computer access, on a cellular telephone, or those that order derivative works or elect to input other demographic information for dissemination, i.e., 'best of' versions, director's cut, narration tracks, and requesting upload of demographic information and promos for upcoming events and other releases, etc. (214).

Figures 2A, 2B, 2C:
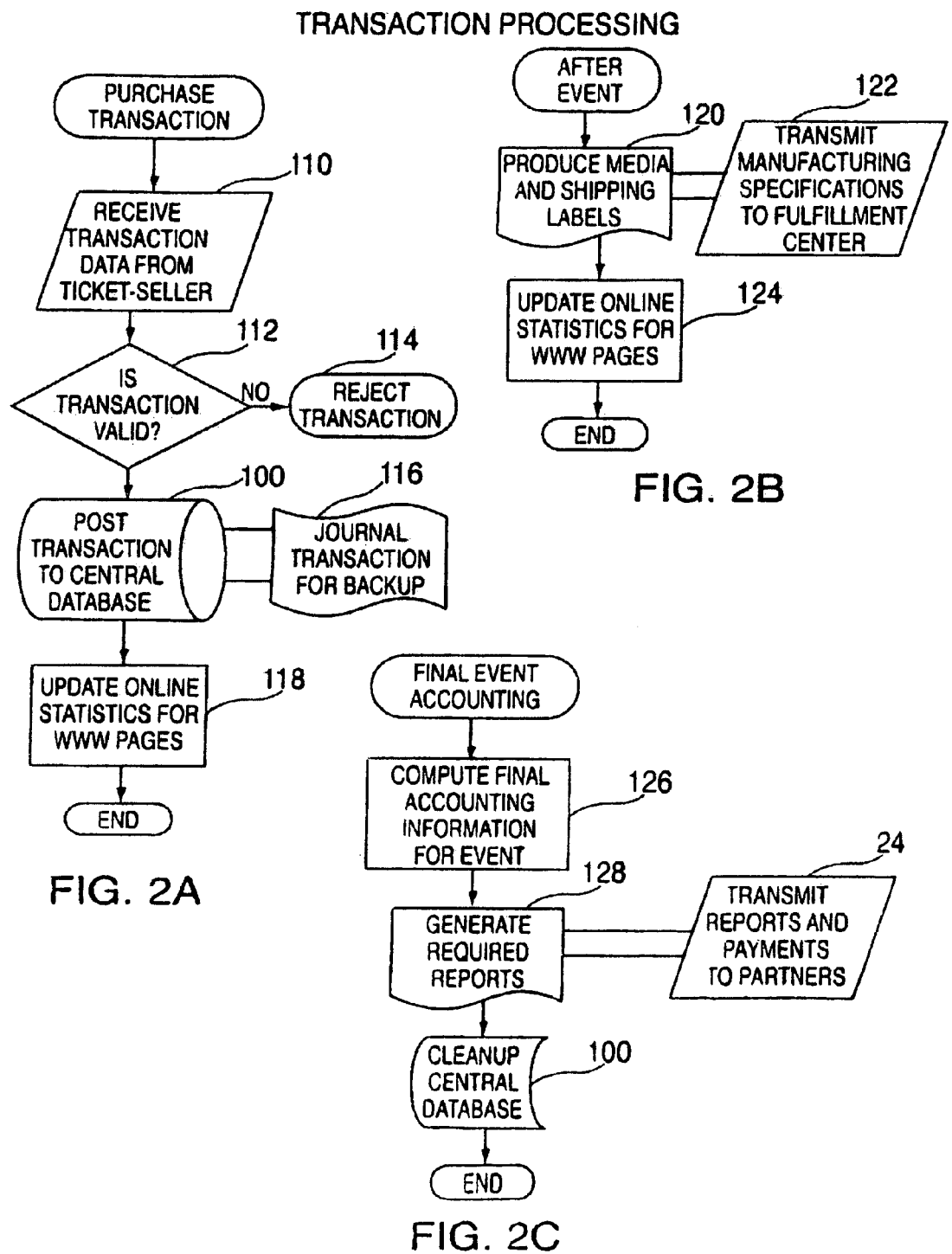
FIGS. 2A-C depict the transaction flow including processing and administration of Recording orders—claimed both from ticket holders and independently from non-ticket holders—payments and accountings to all copyright holders and participants (or "partners").

More particularly, referring to FIG. 1, the system further includes one or more entertainment venues (14), a fulfillment or manufacturing center (300), a plurality of information fee recipients (24) and a plurality of Recording recipients (28). The transaction flow is depicted in FIGS. 2A-C.

The ticket buyer makes a purchase transaction in step (600). During this step, the ticket buyer (10) is presented with the option of pre-buying a tie-in Recording. The price of the Recording is added to the price of his ticket purchase to the live event (or other logged entrance fee or bet). In the event the purchaser desires to retrieve his Recording at the venue immediately upon completion of the performance (or prior to in the case of interactive games), standard authentication methods may be employed, including, but not limited to, bar coding and/or information authentication.

The ticket seller (11), who is already making various allocations for taxes, fees, etc., from the gross receipts, treats the price of the value added Recording similarly. He subtracts his fee, whether fixed or contingent (his incentive to provide this service), and forwards the remainder to the Recording supplier (Recording-seller). Because this is still a single transaction, with the ticket serving as the customer's receipt, the added cost is minimal.

The ticket seller at locations (11) transmits the transaction data over a PC or other standard point-of-sale equipment well known in the art (not shown), which includes the information gathered from the charge card transaction, which identifies the buyer and specifies the address (the charge card address or other address selected by the buyer (10)) to which the Recording is to be sent, to the Data Center (100) (step 610). This transmission is done in real time, through the Internet (19), using industry standard protocols such as XML and is properly secured using one of many industry standard encryption methods.

Upon receipt at the Data Center (100), the transaction information is immediately loaded into the master system database (100A). The database system is capable of Recording a multitude of transactions involving a multitude of events simultaneously, while at the same time providing all of the required reporting and processing functions and maintaining both the physical and logical security of the information which is critical to the successful implementation of the method.

The preferred embodiment preferably uses an industry standard database system, e.g., Oracle, Microsoft SQL Server, IBM DB2, XML, etc., which is scalable, and of an industry standard set of server hardware, which is also scalable to ensure that it can handle whatever transaction load is required.

In step (612) the Data Center (100) checks if the transaction is valid. Invalid transactions are discarded (step 614). In step (615) the Data Center transaction is posted with database (100A). In step (616) the transaction is backed up. Next, various data files containing statistical information are updated in the data base (100A) to reflect the latest transaction(s) (step 618).

As indicated above, the Data Center (100) also encompasses a series of Web servers (100B) providing as Web sites and/or Web services points of access for various interested parties to retrieve information required for their operation. FIG. 2B shows the process for generating the Recordings in fixed media of expression (CD, DVD, e.g.) on site using a suitable Recording subsystem (15) (FIG. 1). During or immediately after the event, the Recording subsystem (15) generates a Recording on an appropriate medium using preferably non-incremental methods. In the alternative, Recordings are available to be retrieved on or off site through enabled terminals in digital format through USB port or other methods including hook-up of iPODs and other storage devices, also authenticated using cellular telephones and Internet subscription accounts. Booklets (if any) are prepared for the buyer together with labels that are affixed to the Recording (step 620). The completed Recording is delivered to the buyer (step 621). In step 622 the manufacturing details are sent to the Data Center (100) and fulfillment center for accounting and statistical analysis. Using this data, in step 624 various statistical data bases are updated with the latest transaction(s). FIG. 2C illustrates the final accounting process. In step 626 the transactions for the event are reconciled and finalized. In step 628 reports are generated. In step 630 the reports and payments to various partners are calculated and transmitted. In step 632 temporary data in the central data base (100) are cleaned out and the central data base is readied for the next event.

Figure 5:
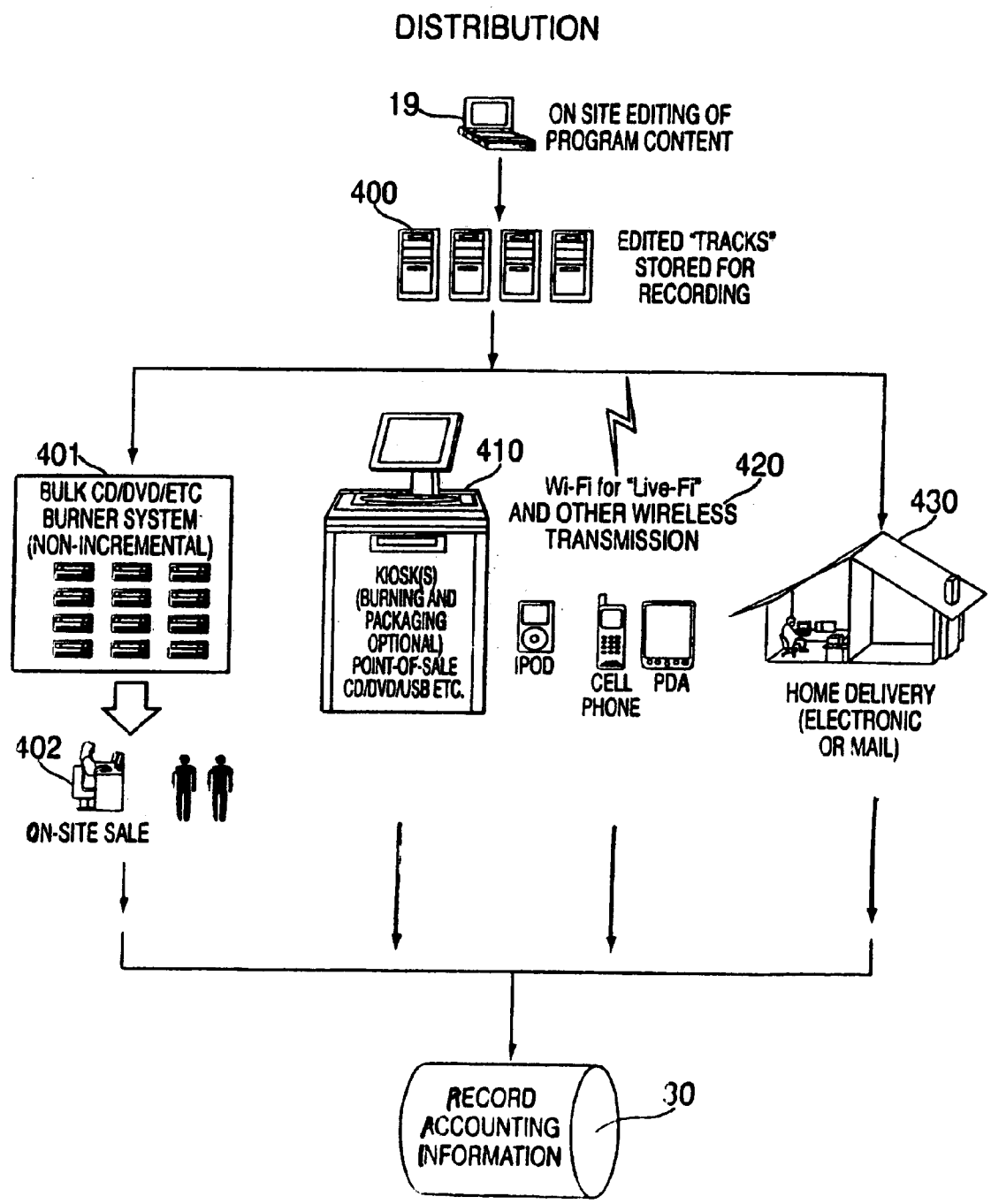
FIG. 5 depicts the methods and systems of On and Off-Site Production and Distribution and authenticated retrieval associated with identifying ticketing information and other uniquely identifying information of a Recording purchaser.
Figure 6A:
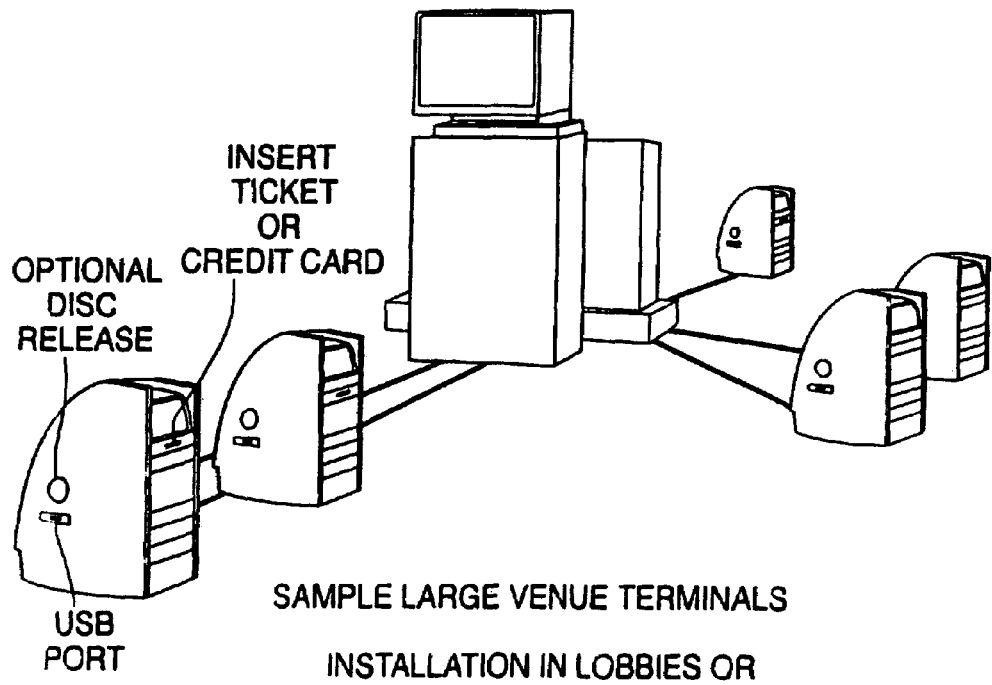
Figure 6B:
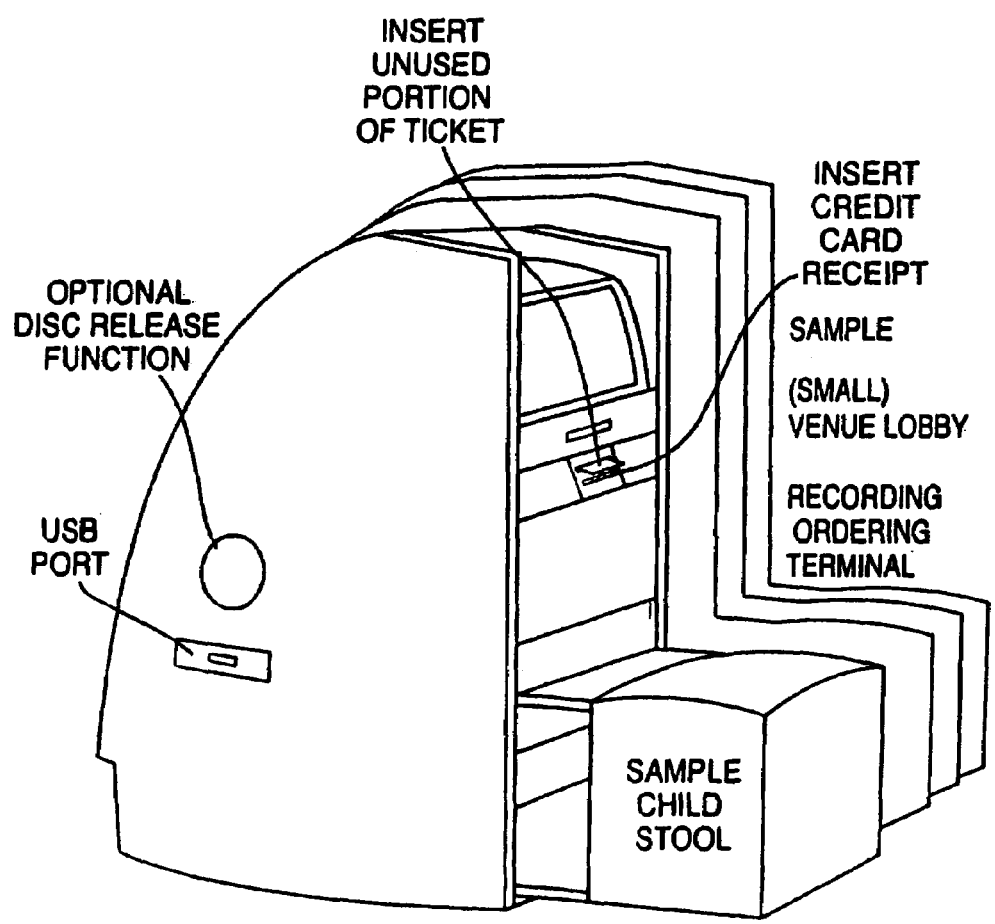
Figure 6D:
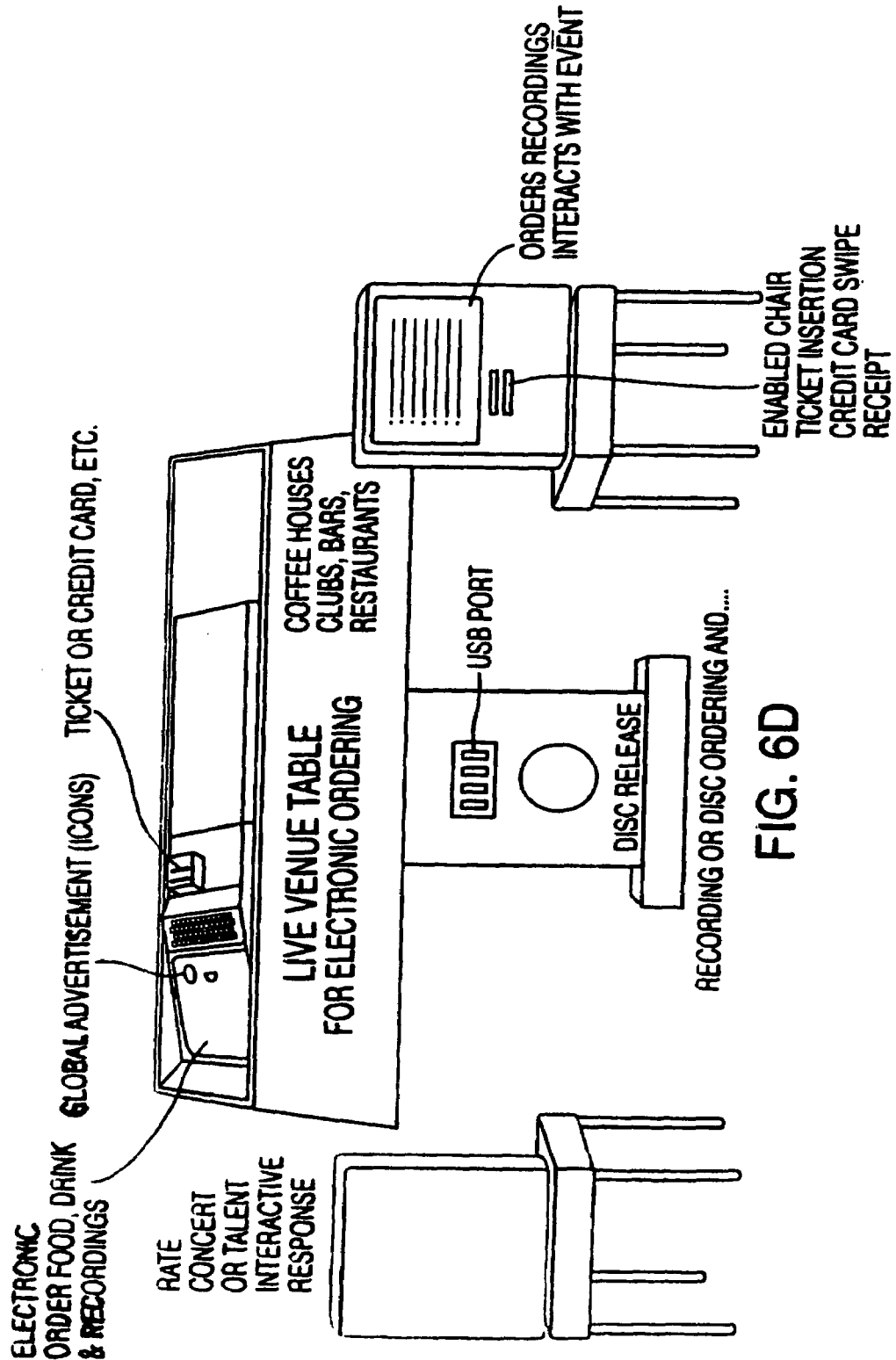

As discussed above, and illustrated in FIG. 1 if a user or buyer wants to take home or receive a live Recording directly at the venue upon completion of the event, standard authentication methods, including but not limited to bar coding, may be used. Referring to FIG. 5, the Recordings from the editor apparatus (19) are stored as tracks on servers (402). Next, the Recordings are transmitted or "burned" on site by updated non-incremental CDR technology generating media (401) in bulk. The media (401) (that may include DVDs. CDs, etc.) are sold to either users or buyers (10), who have prepaid for the media when they bought their tickets, or alternatively to buyers (10A) who have not prepaid and pay for the media at a subsequent time including at the end of the event. The bulk Recordings (401) may be sold by a clerk (403).

Alternatively, however, a kiosk or other enabled terminal (410) is provided that receives the Recording data from servers (402). The kiosk (410) is an automated kiosk, "vending machine" or enabled table in a nightclub/eatery that either burns or spits out a Recording on demand when presented with authenticating information that may be information on the ticket itself and/or prerecords the tracks on a selected media and provides labels, booklets and other materials associated therewith. The media and associated item(s) are then dispensed when the user/attendee inserts his ticket or inputs other identifying authentication information into the kiosk (410.) Alternatively, the kiosk receives the ticket or other input information from the user/orderer and, in response, starts the burning of the media or takes order for the mailing or desired home electronic retrieval. In this configuration, the user may be given the choice of customizing his Recording by selecting specific portions or songs of the event that should be burned on the media, their sequence, etc. or may even order "singles". This will be the preferred method if a kiosk is in the form of a patron's audience chair, table or seat at an eatery, nightclub or showcase. Orders can also be taken at enabled turnstiles or ATM machines at banks, airports, malls and other public venues.

A user (10A) who has not prepaid for the Recording may also obtain one using the kiosk (410) and charging the purchase to his credit card or by using other payment means.

The kiosk (410) may also deliver a Recording as a data file that becomes available for downloading by the user (to a PDA, IPOD or other similar device) through a data port (such as USB port) on the kiosk (410).

Finally, after the event is finished, the Recording can be delivered or distributed electronically as a digital file to the home (420) of the user and the point of sale site (400) may be bypassed. Communications between the various elements of the systems can be implemented over wired or wireless networks. Typical wireless networks that may be employed include Wi-Fi, Bluetooth, etc.

The ticket/Recording buyer (10) can from any terminal, for example, check on the status of his order and perform a limited range of functions, such as changing the delivery address for his order, order additional Recordings, or order that promo information of upcoming concerts and other future releases be sent to him.

Similarly, the entertainment companies and record labels can, for example, check, in real time, to see how many Recordings for their artist have been requested and sold for any event, track the royalty and other payments through the system, and, for example, receive survey responses from those who elected to participate in "new band" ratings. If the buyer opts to allow dissemination of other demographic information including, for example, his order for promos, tickets for upcoming events or releases and other merchandise, the system will accommodate those requests. By integrated methods and systems, it will also allow for ordering and purchase of "best of" releases, director's cuts, narration tracks, and single tracks and compilations emanating from the live event.

The Data Center (100) maintains security and confidentiality through the system. The entertainment entities and "Partners" are issued specific password credentials which are authenticated through standard industry techniques (218). In the case of the ticket/Recording buyer, his ticket number along with information not printed on the ticket, such as his billing address or other identifying information (mother's maiden name, e.g.) is used for verification before he can gain access to the privileged areas of the processing Web site.

As shown in FIG. 1, in addition to users or buyers (10), other entities may also have access to the Data Center (100), including revenue participants (24) that may include several Partners. In addition, specialized servers may also be provided as part of the system. For example, server (20) is used to determine fees and royalties for the various Partners (24). The server (22) provides standard accounting services. These servers can communicate with each other and with other components of the system through standardized networks, such as Internet (19).

Of course, the whole purpose of the system is to manage ordering, packaging and multi-media distribution of live event recordings and to organize and run new types of live events at venues (19) including those to be constructed with new technology regardless of whether they have outside ticketing service companies or their own and help take maximize advantage of the impulse buying potential of the adoring audience and fans. As part of this process, buyers (10) can receive or buy Recordings of the event and other items associated with the event. These materials are available immediately at a point of sale station (or store) (400), as discussed in detail below and shown in FIG. 5. The event is recorded and edited by on-site editing equipment (19) to provide the immediate Recording at a station (400). Non-incremental or other burning technology compatible with updated standard CDR technology is preferentially to be used.

In addition, or alternatively, the event is recorded by digital Recording equipment 16. The recorded data inclusive of mastering, editing and balancing data is then sent to an offsite manufacturing site (300) where the Recordings are generated (on CDs, DVDs and other similar media) and then packaged and distributed to the users (10), as discussed in more detail below and illustrated in FIG. 4. Manufacturing instructions (31) to both sites [.e. station (400) and manufacturing site (300)] are provided by the Data Center (100). Moreover, the Data Center (100) receives inventory and accounting information (30) from both sites.

Figure 3:
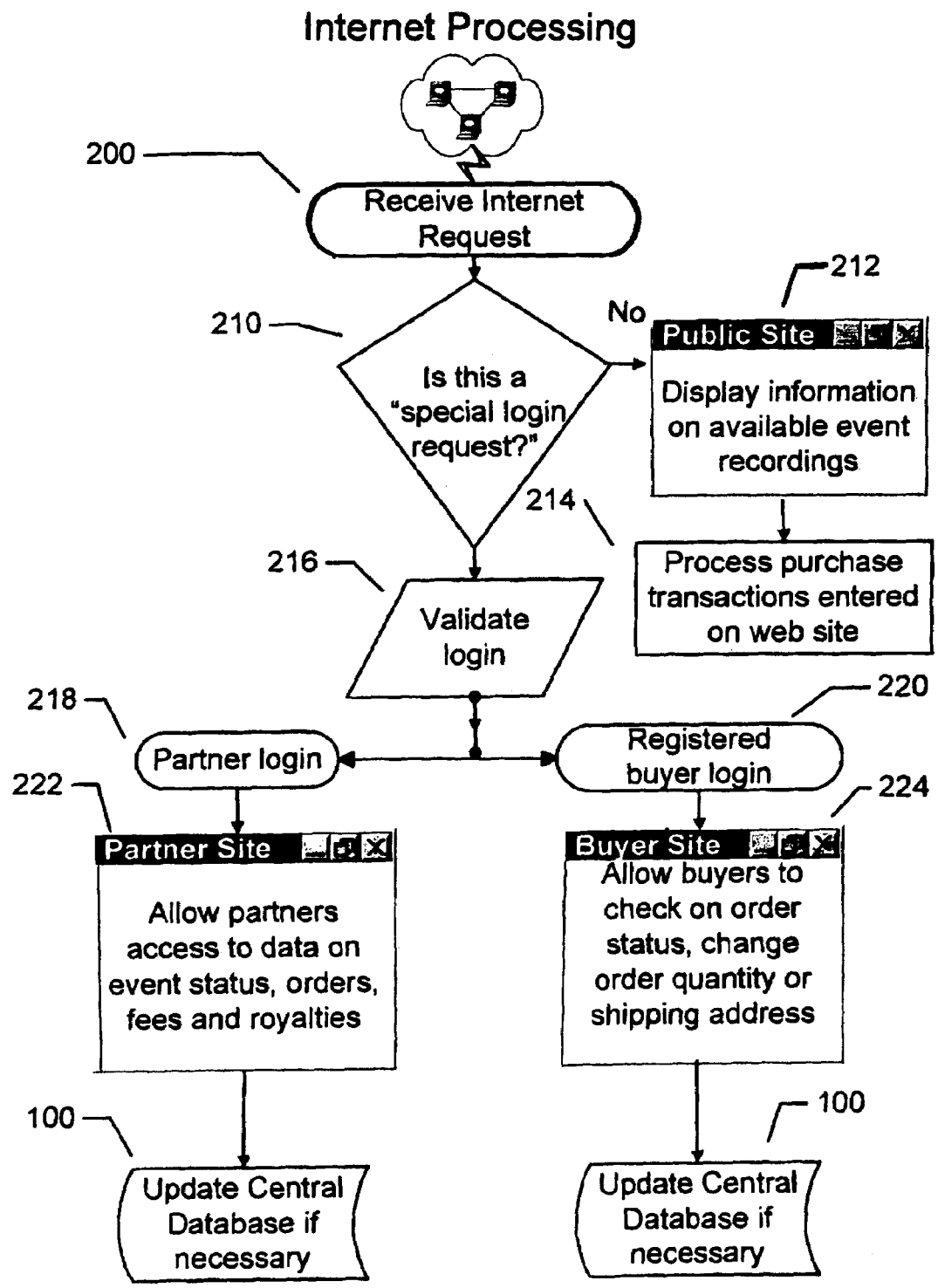
FIG. 3 shows a flow chart for processing transactions and information requests.

Details of how requests for transactions and information are handled by the Data Center (100) are provided in FIG. 3. A request is received by the Data Center (100) in step (200) via the Internet. In step (210) a check is performed to determine if the request is a special request for information (available only to certain subscribers and partners). If it is not, then in step (212) information is retrieved and sent to the requester indicating what services are available, including lists of future events for which tickets, Recordings, and/or other items can be purchased. Lists of other items related, for example, to Recordings from past events, may also be displayed. In step (214) a request for tickets, Recordings or other items is received from a user (10). The request is processed, the user (10) is issued a ticket and the resulting transaction is processed as described in the flow charts of FIGS. 2A-2C.

If in step (210) a special request is identified, then in step (216), the requester is asked to provide a password and the password is validated. If the requester is identified in step (218), then in step (222) he is directed to a special partner web site where he can access data on various events, including their status, number of orders for received for the events, fees collected, royalties due to the partner, etc. In step (223), data related to the partners is updated in the Data Center (100), if necessary.

If the requester is identified as a registered buyer, then in step (220) the buyer logs in and is directed to a buyer site in step 224. At this site, the buyer is allowed to check on the status of his order, he is allowed to change his order, provide information for shipping, etc. The information or changes entered by the registered buyer is stored in the Data Center (100) in step (226).

After a particular event has concluded, the Data Center sends to the fulfillment house (122) information specifying the number of complete and derivative or special order Recordings (120) to produce and the addresses to which those designated to be mailed, should be mailed.

Figure 4:
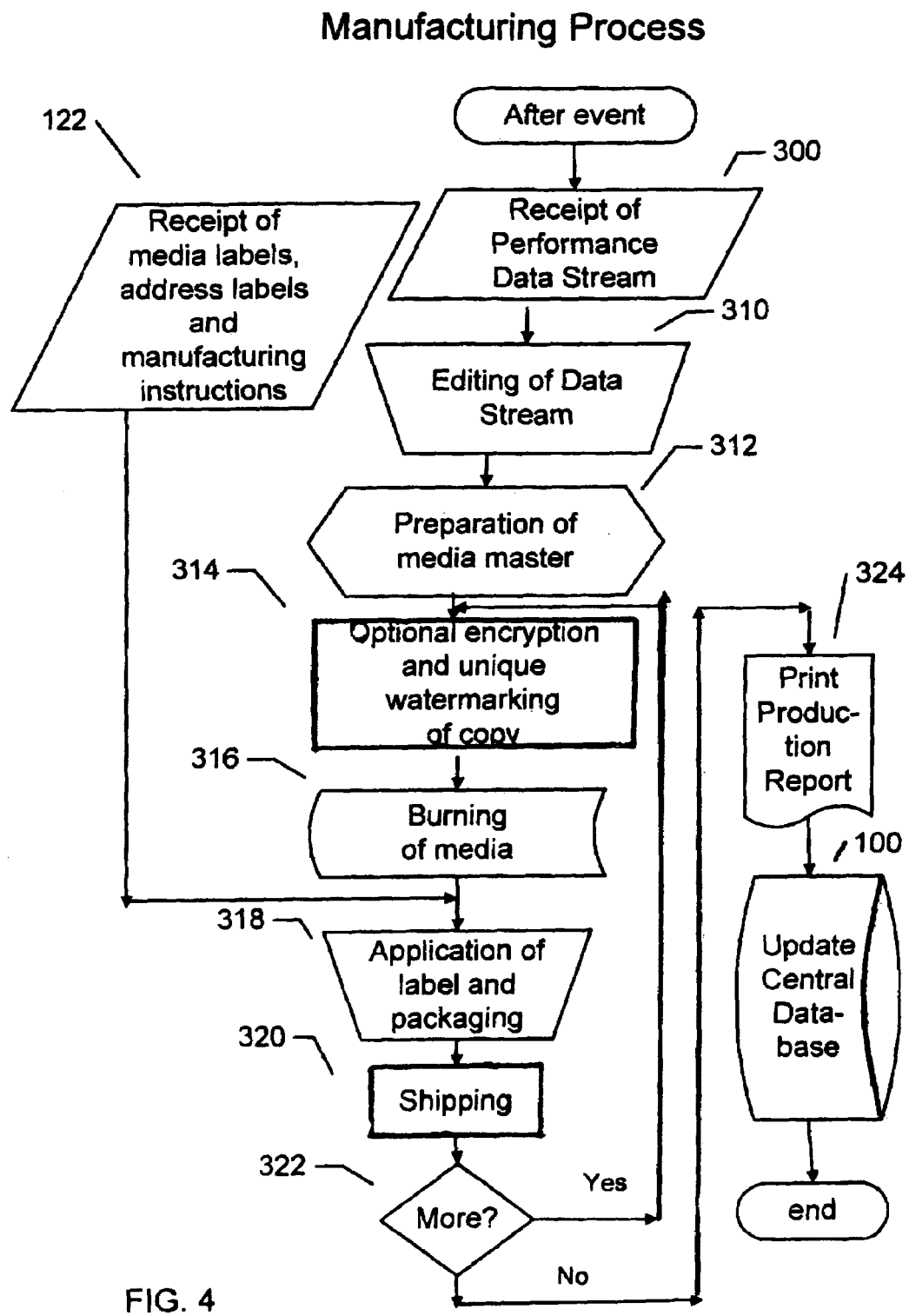
FIG. 4 depicts the method and system of manufacturing/fulfillment including orders for complete, spliced or special purchase Recordings including derivative or edited versions, singles tracks and personalized compilations in fixed, encoded and any other format.

Off site Recording is performed by manufacturing station or site (400). As shown in FIG. 4, after the event, the performance data is received in step (310). This data may be streamed or may be sent electronically in a batch. Alternatively, the data may be recorded on a data storage medium and sent to site (300).

In step (312) the data is edited. Editing may optionally incorporate the disclosed method of digitized conversion from an audience balanced to disc balanced reading. In step (314) the data is prepared for Recording on a master. In step (314) the data is optionally encrypted, and, if desired, a unique watermark is added for copy protection. In step (316) multiple copies are made from the master by burning or other means. In step (318) labels are applied to the media and the labeled media is boxed and packaged together with other materials, such as booklets, pictures, etc. In step (320) the packaged media are shipped.

In step (322) additional copies of the Recordings are made, if necessary. In step (324) a production document is generated. In step (326) the data files at the Data Center (100) are updated to reflect the Recording produced and shipped.

The Data Center 100 also handles all tasks of reporting and accounting for copyright, and other participants and generates detailed statements and accounts including the amounts of statutory and contractual royalties (20).

To summarize, a Recording of a live event or any part of a live event (including spliced, edited and/or derivative special order versions thereof) is ordered before, during or after the event by a buyer who has attended the event or by a non-attendant buyer by any available means including, but not limited to, by using an appropriate Website or enabled hand-held device including a cellular telephone.

While the specific embodiments have been illustrated and described, numerous modifications come to mind without significantly departing from the spirit of the invention and the scope of protection is only limited by the scope of the accompanying claims.

I claim:

1. An apparatus to facilitate the purchase of customizable event or venue content by a person during a live event or immediately following such live event over a computer network comprising:
   a. at least one data center connected to the network said data center comprising a database for storing live event purchase transaction data;
   b. At least one recording subsystem connected to said at least one data center for recording at least a portion of said live event;
   c. At least one editor apparatus connected to a remote user terminal through said network for receiving the recorded live event from the recording subsystem and a user selection request for event content, and for editing the recorded live event based on the selection request; and,
   d. said at least one remote user terminal further comprising means for connecting to said data center via said network, receiving means for receiving said requested event content from the editor apparatus, downloading means for downloading said requested event content onto a user media device, means for providing the live purchase event transaction data and selection means for transmitting the selection request.

2. The apparatus of claim 1 wherein the live event is any one of concert, recital, tour, stage, musical play, sports event, conference, symposium, showcase, comedy revue, screening, exhibition, demonstration, opening, travel, skit, tournament, speech, convention, address, seminar, class, lecture, or sermon.

3. The apparatus of claim 1 wherein the customizable event or venue content is a portion of audio, video, images or a combination thereof emanating from said event.

4. The apparatus of claim 1 wherein the customizable event or venue content is packaged with other venue or sponsor offerings.

5. The apparatus of claim 4 wherein in addition to customizable event or venue content, offerings may be made in conjunction comprising: single titles, "best of tour", director's cuts, narrations tracks, photos, action stills, or pin-ups.

6. The apparatus of claim 1 wherein the computer network is at least one of wired or wireless telecommunications network.

7. The apparatus of claim 1 wherein the live event purchase transaction data is at least one of bets placed, investments, ticketing data, electronic ticketing data, orders for event associated electronic displays, orders for ads, orders placed in response to ads associated with the event, orders to receive recordings or live event and venue content, orders to realize promotional benefits associated with the event offered by its producers, sponsors and distributors, featured artists, celebrities or participants, orders for event content, or orders for offerings unrelated to the event.

8. The apparatus of claim 1 wherein the editor apparatus is connected to a fulfillment center's database.

9. The apparatus of claim 1 wherein the editor apparatus is connected to a telecommunications carrier's database.

10. The apparatus of claim 1 wherein the user media device is at least one of cell phone, personal digital assistant, handheld device, enabled hospitality or conference table, enabled audience or airline chair/seat, enabled turnstile, or enabled gate.

* * * * *